UNITED STATES PATENT OFFICE.

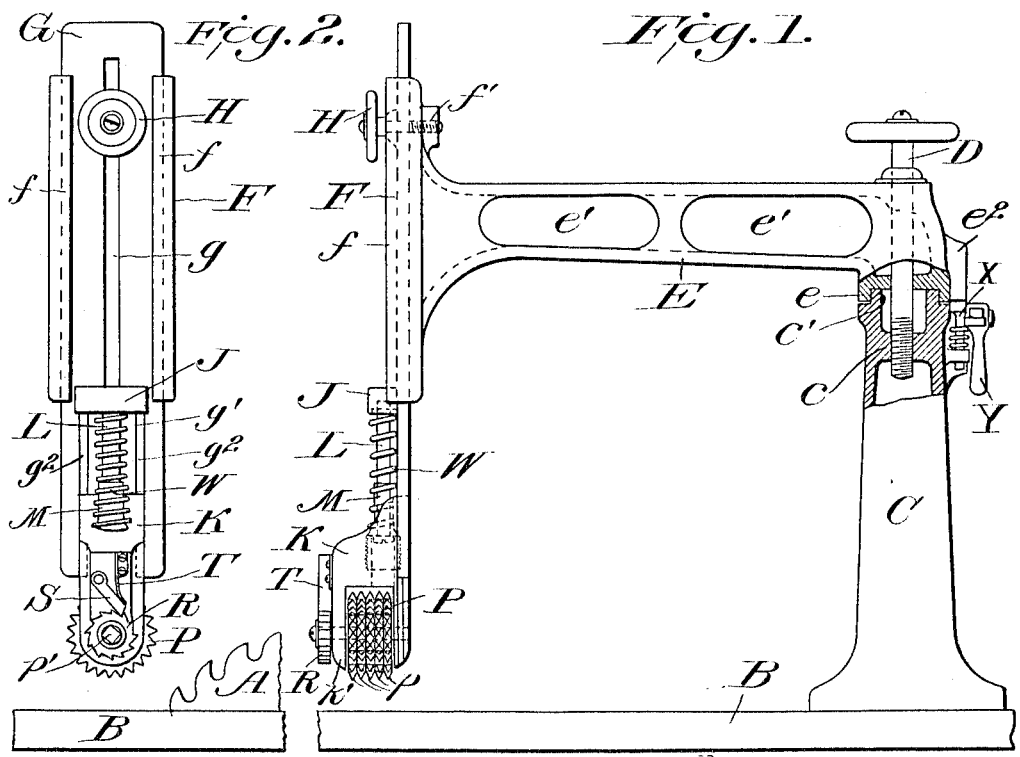

FREDRICK EMERY CARSON, OF RICHMOND, VIRGINIA, ASSIGNOR OF ONE-THIRD TO JAMES McEVOY AND ONE-THIRD TO WILLIAM McEVOY, BOTH OF RICHMOND, VIRGINIA.

WORK-HOLDER.

1,089,901. Specification of Letters Patent. Patented Mar. 10, 1914.

Application filed April 15, 1913. Serial No. 761,226.

*To all whom it may concern:*

Be it known that I, FREDRICK E. CARSON, a citizen of the United States, and a resident of Richmond, in the county of Henrico and State of Virginia, have invented certain new and useful Improvements in Work-Holders, of which the following is a full, clear, and exact specification.

This invention relates to work holders and is especially designed as an attachment for circular or rip saw tables, its function being to hold the boards or timbers down in proper position on the table after passing the saw.

One object of the invention is to prevent injury to the operator of the saw, inasmuch as the holder prevents material from catching on the saw and flying back, and also serves to hold the material or timber to its proper course, thus relieving the operator from the necessity of placing his hands within dangerous proximity to the saw while in motion.

Another object is to provide a work holder for the purpose specified which is adapted to be used with equal success on timbers or boards of various thicknesses and which will operate with the same beneficial effects from the beginning to the end of a cut or for the entire length of every plank, thereby eliminating the extra workman or helper usually employed for holding and taking off the boards or planks as they are cut.

A further object is to provide a work holder for the purpose specified which may be thrown out of the path of the work when desired, as when a board is to be fed downward upon the saw for cutting an interior or closed ended slot.

Other objects will appear as the description proceeds.

The invention will first be described in connection with the accompanying drawings, which constitute a part of this specification, and then more specifically set forth in the claims at the end of the description.

In the accompanying drawings, in which the same reference characters are used to designate similar parts throughout the several views: Figure 1 is a side elevation of a work holder constructed in accordance with my invention, parts being broken away to show the swivel joint between the arm and standard; Fig. 2 is an end view, showing the head of the arm in front elevation; Fig. 3 is a detail end view of upper end portion of the standard and rear end of the arm, showing the automatically locking latch for holding the arm in operative position; Fig. 4 is a diagrammatic plan view, showing the relative positions of the work holder, saw, and gage, and Fig. 5 is a detail vertical section through the roller-carrying foot and its guiding pin.

Referring more particularly to the drawings, A designates a circular saw operatively mounted on a table B. Secured to said table at one side of the plane of the saw is the standard C of my improved work holder. Said standard may be of hollow metal with a web $c$ into which the set screw D is fitted.

Mounted to turn in a horizontal plane on the upper end of the standard is an arm E having at one end a head F. As illustrated in Fig. 1, the standard has a stepped extension $c'$ at its upper end around which is snugly fitted a collar or circular flange $e$ on the arm, and said collar or flange is held down in proper position on the extension $c'$ by the set screw D. Thus the arm is adapted to be turned on the standard without rocking, and the connection between them is well able to withstand the strain to which the device is subjected in operation. Said arm may be made of hollow metal generally circular in cross section, and its weight reduced by cutting away portions of its sides, as at $e'$.

The head F, which is preferably made integral with the arm, is vertically disposed and has lateral flanges $f$ forming a way for the slide G. This slide has a vertical slot $g$ extending downwardly from a point near its upper end, and through said slot is passed a set screw H taking into the head F, as at $f'$, Fig. 1. It will be readily understood that by means of this slot and set screw the slide may be adjusted or set at different heights to correspond to the thickness of the work.

A block J is fixed to the outer face of the slide G below the lower end of the slot $g$, and below said block the slide is provided with a wider slot or opening $g'$ having vertical inner edges which are preferably V-shaped as at $g^2$ to act as guides for the foot K. Said foot is supported on the slide G by an inverted bolt or pin L having its upper end screwed into or otherwise fastened to the block J. A sleeve M having bores of two diameters, is fitted loosely around the lower end portion of the pin L, the head of the pin being adapted to engage the shoulder $m$ formed at the juncture of said bores, as clearly shown in Fig. 5, for retaining the sleeve on the pin. The foot is secured to the sleeve in any suitable manner as by the screw connection shown at $m'$, Fig. 5. This figure also shows the foot open at $k$ through to the fork $k'$, so that access may be had to the bolt from below.

Journaled in the fork $k'$ of the foot is a corrugated or milled roller P preferably provided with pointed projections $p$ of which there are a plurality of rows from end to end of the roller, thus providing means for effectively gripping the work at one or both sides of the cut made by the saw. The roller may be made fast on a spindle $p'$ by a screw $p^2$, as shown in Fig. 5. Said spindle extends beyond the fork at one side and carries a ratchet wheel R keyed thereto and engaged by a pawl S pivoted on the foot and pressed by a spring T for the purpose of restricting the roller to rotation in one direction, namely that corresponding to the feed of the work, thus preventing any reverse or rearward movement of the latter. The roller is held to the work with a cushioned effect by a coiled spring W mounted around the pin L and upper portion of the sleeve M, the end of said spring abutting against the block J and the foot K.

The arm E is normally held rigidly in a position at right angles to the plane of the saw, with the roller in line with the latter, Fig. 4, by a latch X and a pair of lugs $c^2$ and $e^2$ on the standard and arm, respectively. As best shown in Fig. 3, the lug $e^2$ and latch X are rounded, and the latter is spring-pressed, to permit the automatic locking of the arm as it is swung into normal operative position. When it is desired to swing the arm out of operative position, as shown in dotted lines in Fig. 4, the latch may be released by moving the handle Y, Fig. 3, to the right. In Fig. 4, the usual gage Z is shown applied to the table in order to clearly show the proper relative position of the work holder.

In operation it will readily be seen that as the work, a timber, for instance, is fed along the table in the direction of the arrow in Fig. 4, said work will pass below the roller on the foot of the holder almost immediately after passing the saw. Said holder will keep the severed strip as well as the main timber in proper position throughout the sawing operation, and will prevent material from flying back, as well as dispense with the necessity of the operator putting his hands into dangerous proximity to the saw.

Having thus described my invention what I claim as new and desire to secure by Letters Patent of the United States is:

1. In a work holder for the purpose specified, the combination with a head, of a pin disposed vertically thereon with a head on its lower end, a sleeve having two bores of different diameters, the pin fitting loosely in the smaller bore and the head of the pin engaging the shoulder at the juncture of the bores for retaining the sleeve on the pin, a roller carrying foot secured to said sleeve, and a coiled spring mounted around the pin and abutting against the foot.

2. In a work holder for the purpose specified, the combination with a head, of an adjustable slide thereon, a spring pressed roller carrying foot slidably mounted on said slide, a block fixed to the slide, a vertically disposed pin fastened to said block and having a head on its lower end, means for removably retaining the foot on the lower end portion of the pin above its head, and a coiled spring mounted around the pin and abutting at its opposite ends against the block and foot.

In testimony whereof I have signed my name to this specification in the presence of two attesting witnesses.

FREDRICK EMERY CARSON.

Witnesses:
JNO. B. NEWELL,
H. W. CARSON.